| United States Patent [19] | [11] | 4,105,648 |
|---|---|---|
| Gruber et al. | [45] | Aug. 8, 1978 |

[54] CROSSLINKED POLYACRYLAMIDES CONTAINING SILYL GROUPS

[75] Inventors: Urs Gruber, Arlesheim; Gerd Greber, Binningen; Hans-Peter Kriemler, Basel, all of Switzerland

[73] Assignee: Ciba-Geigy Corporation, Ardsley, N.Y.

[21] Appl. No.: 778,408

[22] Filed: Mar. 17, 1977

Related U.S. Application Data

[63] Continuation of Ser. No. 610,203, Sep. 4, 1975, abandoned, which is a continuation-in-part of Ser. No. 403,359, Oct. 4, 1973, abandoned.

[30] Foreign Application Priority Data

Oct. 27, 1972 [CH]  Switzerland ..................... 015731/72

[51] Int. Cl.$^2$ ............................................. C08F 30/08
[52] U.S. Cl. .............................. 526/204; 260/448.2 R; 260/448.2 B; 526/261; 526/279; 260/826
[58] Field of Search ................ 260/79.3 MU, 448.2 B; 526/279, 261; 526/29

[56] References Cited

U.S. PATENT DOCUMENTS

3,247,171   4/1966   Walker ................................. 526/303

OTHER PUBLICATIONS

Steiner, Hans, Thesis No. 4569, 1970, pp. 21–28.

*Primary Examiner*—Christopher A. Henderson, Jr.
*Attorney, Agent, or Firm*—Luther A. R. Hall

[57] ABSTRACT

Crosslinked polyacrylamides containing silyl groups are disclosed which are prepared in a simple and economical manner by polymerizing silylated acrylic acid amides in the presence of a crosslinking agent such as 1,4-butanediol-diacrylate. The resultant crosslinked silylated polyacrylamides are insoluble in customary solvents and are useful for the transfer of silyl groups to compounds which contain at least one mobile hydrogen atom. They may be employed, e.g., in gas chromatography, mass spectroscopy and chemical syntheses (for instance for the introduction of protective silyl groups).

9 Claims, No Drawings

CROSSLINKED POLYACRYLAMIDES CONTAINING SILYL GROUPS

This application is a continuation of application, Ser. No. 610,203, filed Sept. 4, 1975, now abandoned, which in turn is a continuation-in-part application of application, Ser. No. 403,359, filed Oct. 4, 1973, now abandoned.

The present invention relates to new crosslinked polyacrylamides containing silyl groups and their use for transferring silyl groups to compounds which contain at least one mobile hydrogen atom.

It has been found that new crosslinked polyacrylamides containing silyl groups can be prepared simply and economically by polymerising a silylated acrylic acid amide, of formula Ia or Ib

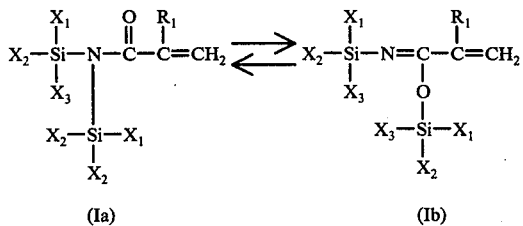

wherein
$X_1$, $X_2$ and $X_3$ independently of one another represent hydrogen, alkyl having 1 or 2 carbon atoms, alkoxy having 1 to 4 carbon atoms, cyclohexyl, phenyl, phenoxy or benzyl, and
$R_1$ is hydrogen or alkyl having 1 to 4 carbon atoms, in the presence of from about 5 to 250 mole%, based on the silylated acrylic acid amide, of a crosslinking agent of formula II

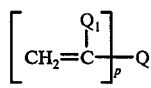

wherein
p represents the number 2 or 3,
$Q_1$ represents hydrogen or methyl,
Q, when $p = 2$, represents —$SO_2$—, phenylene,

with 2 to 4 carbon atoms in the alkylene moiety,

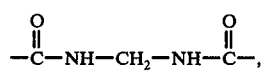

or, when $X_1$, $X_2$ and $X_3$ are each methyl, also represents

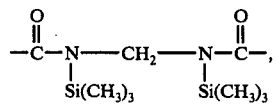

or, when $p = 3$, Q represents the group of the formula

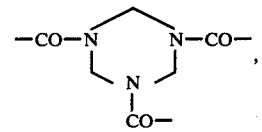

the polymerisation being carried out at a temperature between about 20° and 120° C.

The silylated acrylic acid amides of formula Ia and Ib are tautomers [see, e.g., L. Birkofer et al., Angewandte Chemie, 75,95(1963)].

Alkoxy groups $X_1$, $X_2$ and $X_3$ may be straight or branched chained, such as methoxy, ethoxy, n-propoxy, isopropxy and n-butoxy.

Examples of alkyl radicals $R_1$ are methyl, ethyl, n-propyl and n-butyl.

Suitable silylated acrylic acid amides of formula Ia or Ib are, e.g., bis-trimethylsilyl-acrylic acid amide, bis-trimethoxysilyl-acrylic acid amide, bis-di-n-propoxysilyl-acrylic acid amide, bis-trimethylsilyl-methacrylic acid amide, bis-triethylsilylmethacrylic acid amide, bis-diphenylsilyl-acrylic acid amide, bis-dimethylcyclohexylsilyl-acrylic acid amide, bis-methyl-diethylsilyl-acrylic acid amide, and bis-phenoxysilyl-acrylic acid amide.

Preferred silylated acrylic acid amides of formula Ia or Ib are those wherein $X_1$, $X_2$ and $X_3$ independently of one another are methyl, ethyl or phenyl, and $R_1$ is hydrogen, methyl or ethyl.

Very particularly preferred are silylated acrylic acid amides of formula Ia or Ib wherein $X_1$, $X_2$ and $X_3$ are each methyl and $R_1$ is hydrogen or methyl.

The silylated acrylic acid amides of formula Ia or Ib are known or can be manufactured according to methods which are in themselves known, e.g., by reacting an acrylic acid amide of formula III

wherein $R_1$ has the meaning given under formulae Ia and Ib, with a silylating agent of formula IV

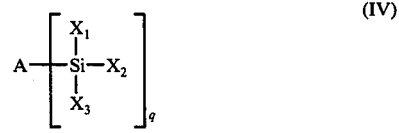

wherein $X_1$, $X_2$ and $X_3$ have the meanings given under formulae Ia and Ib,
q represents the number 1 or 2,
A, when q is the number 1, represents halogen, more particularly chlorine or bromine,

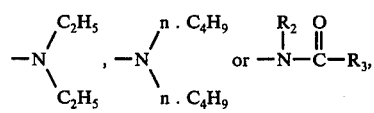

and when q is the number 2, A represents —NH—,

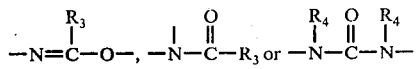

with

R$_2$ denoting hydrogen, substituted or preferably unsubstituted alkyl with 1 to 4 carbon atoms in the alkyl moiety, unsubstituted or substituted cycloalkyl, aryl or aralkyl, especially cyclohexyl, phenyl and benzyl, R$_3$ denoting the same as R$_2$ or trifluoromethyl, and R$_4$ independently of one another denoting substituted or preferably unsubstituted alkyl with 1 to 4 carbon atoms in the alkyl moiety, unsubstituted or substituted cycloalkyl, aryl or aralkyl, especially cyclohexyl, phenyl and benzyl, or a grouping

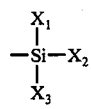

wherein X$_1$, X$_2$ and X$_3$ have the meanings given above.

As suitable acrylic acid amides of formula III there may be mentioned: acrylic acid amide, methacrylic acid amide, ethylacrylic acid amide and n-propyl-acrylic acid amide.

Preferably, acrylic acid amides of formula III are used wherein R$_1$ denotes ethyl, and especially hydrogen or methyl.

Examples of suitable silylating agents of formula IV are:

- Halogenosilanes of formula IVa

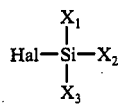 (IVa)

wherein Hal denotes chlorine or bromine, and X$_1$, X$_2$ and X$_3$ have the meanings given above, especially halogenosilanes of formula IVa wherein X$_1$, X$_2$ and X$_3$ independently of one another are methyl, ethyl or phenyl and Hal has the indicated meaning.

As examples of halogenosilanes of formula IVa there may be mentioned: trimethoxychlorosilane, trimethylchlorosilane, triphenylbromosilane, methyldiethylchlorosilane, triphenylchlorosilane, triethylchlorosilane, tribenzylchlorosilane, triphenoxychlorosilane and di-n-propoxychlorosilane.

Trimethylchlorosilane is very particularly preferred.

- Amides of formulae IVb or IVc

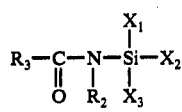 (IVb)

or

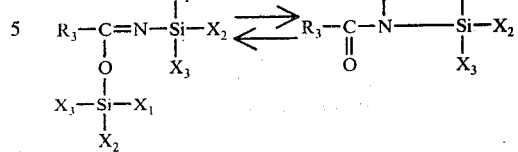 (IVc)

wherein R$_2$, R$_3$, X$_1$, X$_2$ and X$_3$ have the above-indicated meanings, such as bis-trimethylsilylacetamide, bis-triethylsilylacetamide, N-methyl-N-trimethylsilylacetamide, bis-trimethylsilylformamide, bis-trimethylsilyltrifluoroacetamide, bis-trimethylsilylbenzamide, bis-trimethylsilyl-p-methoxybenzamide and bis-trimethylsilyltolylamide.

- Ureas of formula IVd

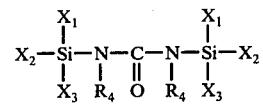 (IVd)

wherein R$_4$, X$_1$, X$_2$ and X$_3$ have the meanings given above, such as N,N'-dimethyl-N,N'-ditrimethylsilylurea, N,N'-diphenyl-N,N'-ditrimethylsilylurea and N,N'-bis-(trimethylsilyl)urea.

-N,N-Diethyl-trimethylsilylamine, N,N-diethyl-triethylsilylamine and N,N-di-n.butyl-trimethylsilylamine.

-Tetramethyl- and hexamethyldisilazane.

The silylation of the acrylic acid amides of formula III with the silylating agents of formula IV can be carried out in a manner which is in itself known, preferably in an aprotic organic solvent which is inert towards the reactants, at temperatures between about 20° and 120° C, more particularly between about 40° and 80° C. The silylating agent is employed in at least stoichiometric amount per amide or carbonyl group to be silylated. Advantageously, said silylating agents are employed in an approximately 1.5-fold to 20-fold excess, depending on the type of silylating agent used.

Examples of suitable inert aprotic organic solvents are:

-N,N-dialkylamides of aliphatic monocarboxylic acids having 1 to 3 carbon atoms in the acid moiety, such as N,N-dimethylformamide, N,N-dimethylacetamide, N,N-diethylacetamide and N,N-dimethyl-methoxyacetamide;
-cyclic amides such as N-methyl-2-pyrrolidone, N-acetyl-2-pyrrolidone and N-methyl-ε-caprolactame;
-optionally chlorinated aromatic hydrocarbons such as benzene, toluene, xylenes and chlorobenzene;
-cycloaliphatic hydrocarbons such as cyclopentane and cyclohexane;
-chlorinated aliphatic hydrocarbons such as methylene chloride, chloroform, carbon tetrachloride, tetrachloroethane and tetrachloroethylene;
-cyclic ethers such as tetrahydrofurane and dioxane.

It is also possible to use mixtures of the above-mentioned aprotic organic solvents.

If halogenosilanes of formula IVa are used for the silylation, the reaction is advantageously carried out in the presence of a hydrogen halide acceptor, such as triethylamine or pyridine. If these hydrogen halide acceptors are employed in appropriate excess, they can also serve as solvents, optionally in admixture with one of the above-mentioned aprotic organic solvents. Preferably, the silylation is effected in triethylamine. After completion of the reaction, the silylated acrylic acid amides of formula Ia or Ib can be isolated and purified in a conventional manner, for example by distillation.

The crosslinking agents of formula II are known compounds with the exception of N,N'-bis-trimethylsilyl-N,N'-methylene-bis-acrylamide. The following are mentioned as suitable crosslinking agents of formula II: divinylbenzene, divinylsulphone, ethylene glycol diacrylate, ethylene glycol dimethacrylate, 1,2-propanediol-diacrylate, 1,4-butanediol-diacrylate, 1,4-dubtanediol-dimethacrylate, tris-1,3,5-acryloyl-2,2,4,4-6,6-hexahydro-s-triazine, N,N'-methylene-bis-acrylamide and N,N'-bis-trimethylsilyl-N,N'-methylene-bis-acrylamide. N,N'-bis-trimethylsilyl-N,N'-methylene-bis-acrylamide is new and can, for example, be manufactured by silylation of N,N'-methylene-bis-acrylamide with trimethylchlorosilane in triethylamine.

Ethylene glycol-dimethacrylate, 1,4-butanediol-diacrylate 1,4-butanediol-dimethacrylate, N,N'-methylene-bis-acrylamide and N,N'-bis-trimethylsilyl-N,N'-methylene-bis-acrylamide are particularly preferred.

The crosslinking agents of formula II are employed in an amount of from about 5 to 250 mole%, based on the weight of the silylated acrylic acid amide of formulae Ia or Ib, more particularly in an amount of from about 10 to 50 mole%.

The polymerisation of the silylated acrylic acid amides of formulae Ia or Ib in the presence of a crosslinking agent of formula II is conveniently carried out at temperatures between about 20° and 120° C, preferably in the presence of a radical initiator such as organic peroxides or azo compounds, e.g., di-tert.butylperoxide, benzoylperoxide, diacyl peroxides, tert.butylperbenzoate, tert.alkyl peroxy carbonates and α,α'-azoisobutyronitrile. The radical initiators are conveniently employed in an amount of from about 0.01 to 5.0 percent by weight, particularly from 0.01 to 2.0 percent by weight, based on the total weight of the monomers.

The polymerisation can be carried out without or, preferably, with the addition of an inert aprotic organic solvent, and is advantageously carried out with exclusion of moisture, for example under nitrogen.

Suitable inert aprotic organic solvents for carrying out the polymerisation are, e.g., -N,N-dialkylamides of aliphatic monocarboxylic acids having 1 to 3 carbon atoms in the acid moiety, such as N,N-dimethylformamide, N,N-dimethylacetamide, N,N-diethylacetamide and N,N-dimethyl-methoxyacetamide;
-cyclic amides such as N-methyl-2-pyrrolidone, N-acetyl-2-pyrrolidone and N-methyl-ε-caprolactame;
-optionally chlorinated aromatic hydrocarbons such as benzene, toluene, xylenes and chlorobenzene;
-aliphatic hydrocarbons such as n-pentane and n-hexane;
-cyclic ethers such as tetrahydrofurane and dioxane.

Preferred solvents for the polymerisation are anhydrous benzene, toluene, cyclohexane and dioxane.

The reaction times are usually between about 5 minutes and 20 hours.

After completion of the reaction, crosslinked polyacrylamides containing silyl groups are obtained which are insoluble in all customary solvents.

It is also possible to effect the polymerisation in the presence of an inert carrier material, thereby coating said carrier materials with the crosslinked polyacrylamides containing silyl groups. Examples of suitable inert carrier materials are urea-formaldehyde and melamine-formaldehyde resins, aluminium oxide, silica gel, porous polystyrene or polyacrylamide gels, porous glass and porous quartz spheres. The inert carrier material can be employed in any desired form, e.g. in the form of powders or granules. In this manner, pressure-resistant silylation gels are obtained which only swell slightly or do not swell at all and which can be used with advantage also in chromatography tubes, as a silylating permeation bed.

Crosslinked polyacrylamides containing silyl groups which are prepared by polymerisation of bis-trimethylsilylacrylic acid amide in the presence of ethylene glycol-dimethacrylate, 1,4-butanediol-diacrylate or N,N'-bis-trimethylsilyl-N,N'-methylene-bis-acrylamide are very particularly preferred, the latter affording especially effective silylating agents.

The crosslinked polyacrylamides containing silyl groups which are prepared according to the invention are very effective silylating agents, i.e. they are suitable for transferring silyl groups to compounds which contain at least one mobile hydrogen atom, more particularly compounds which contain —OH, —COOH, —SH, —COSH, —NH$_2$, —NH—R$_5$ and —CONH—R$_5$ groups wherein R$_5$ denotes for example an alkyl, cycloalkyl, aralkyl or aryl group. Said crosslinked polyacrylamides containing silyl groups can be used, for example, in gas chromatography or mass spectroscopy, for peptide, nucleoside, nucleotide and saccharide syntheses and the like.

As examples of classes of compounds which can be silylated with the polyacrylamides according to the invention there may be mentioned: alcohols, phenols, amines, amides, ureas, carboxylic acids, aminoacids, lactams, carbohydrates, peptides, steroids, nucleosides and nucleotides.

The transfer of silyl groups, or trans-silylation, with the polyacrylamides according to the invention is effected in a heterogeneous phase. The use of the insoluble crosslinked polyacrylamides containing silyl groups, according to the present invention, has proved particularly advantageous because, in contrast to known trans-silylation reactions with monomeric silylating agents, such as halogenosilanes, for example trimethylchlorosilane, or amides, for example bis-trimethylsilylacetamide, no by-products which interfere with the reaction or are difficult to remove, such as salts, amides and the like, are formed. Moreover, both excess polymeric silylating agent and the desilylated polyacrylamides can, if desired, be removed easily, for example by means of filtration.

The polyacrylamides containing silyl groups, according to the invention can be employed in any desired form, for example as powders, granules or coatings, for transferring silyl groups on compounds as defined.

EXAMPLE 1

10 g (0.046 mol) of bis-trimethylsilylacrylic acid amide, 2.5 g (0.012 mol) of 1,4-butanediol-diacrylate and 50 mg of α,α'-azo-isobutyronitrile are dissolved in 50 ml of anhydrous benzene under nitrogen in a 100 ml round flask with reflux condenser. The reaction mixture is then warmed to 70° C and kept at this temperature for 4 hours. A crosslinked poly-bis-trimethylsilylacrylamide (degree of crosslinking = 0.2) is obtained in the form of a clear homogeneous gel which is insoluble in the customary solvents.

$$\text{Degree of crosslinking} = \frac{n_C \cdot \frac{f}{2}}{n_C \cdot \frac{f}{2} + n_M}$$

$n_C$ = mols of crosslinking agent,
$n_M$ = mols of monomer,
$f$ = functionality of the crosslinking agent, for example 2 or 3.

To determine the swelling factor, which is a measure of the density of crosslinking, 5 ml of the gel obtained are freeze-dried in a high vacuum. The resulting loose mass is firmly pressed together in a graduated test tube and is then covered with anhydrous benzene. After 24 hours, the gel has swollen from 1.4 cm³ to 4.5 cm³, that is to say to a 3.75-fold times its volume (swelling factor = 3.75).

Analysis of the freeze-dried gel: calculated C:52.3%; H:9.28%; N:4.8%; Si:20.8%; found C:51.7%; H:8.7%; N:5.4%; Si:18.4%.

The bis-trimethylsilylacrylic acid amide used as the starting material in the above example is manufactured as follows:

71 g (1 mol) of acrylic acid amide are dissolved in 750 ml of anhydrous triethylamine in a 6 liter three-necked flask equipped with a stirrer and a reflux condenser. 270 g (2.5 mols) of trimethylchlorosilane are then added dropwise over the course of 2 hours at room temperature (approximately 25° C). The temperature is then slowly raised to 60° C and the reaction mixture is stirred for about 16 hours at this temperature. The triethylamine hydrochloride which has precipitated is filtered off under protective gas and the filter cake obtained is rinsed with 200 ml of triethylamine. The triethylamine is then distilled off under a slight vacuum at 40°–45° C. The resulting concentrated filtrate is subjected to a purification distillation with addition of a little sulphur as a polymerisation inhibitor. 149 g (69% of theory) of bis-trimethylsilylacrylic acid amide, boiling at 71° C/20 mm Hg, are obtained.

Analysis: calculated C:50.17%; H:9.82%; N:6.57%; Si:26.07%; found C:50.2%; H:9.7%; N:6.5%; Si:25.9%.

EXAMPLE 2

If on Example 1, whilst otherwise following the same procedure, 10 g (0.046 mol) of bis-trimethylsilylacrylic acid amide are used and instead of 2.5 g (0.012 mol) of 1,4-butanediol-diacrylate 2 g (0.008 mol) of tris-1,3,5-acryloyl-2,2,4,4,6,6-hexahydro-s-triazine in 50 ml of dry dioxane are used, a crosslinked poly-bis-trimethylsilylacrylamide having a degree of crosslinking of 0.2 is obtained in the form of a clear homogeneous gel.

EXAMPLE 3

10 g (0.0465 mol) of bis-trimethylsilylacrylamide and 3 g (0.0125 mol) of a 55% by weight solution of divinylbenzene in ethylvinylbenzene as well as 0.1 g of benzoylperoxide are dissolved in 30 mol of cyclohexane and heated to 70° C for 4 hours (crosslinking agent about 27 mole%). A rigid, opaque gel is obtained which is insoluble in the usual solvents. A very slight swelling of the gel in anhydrous benzene is observed (swelling factor determined as described in Example 1 = 1.1).

When proceeding as described above, but using petrol ether as the solvent, the crosslinked silylated polyacrylamide precipitates as a granular mass.

EXAMPLE 4

(A) 10 g (0.0465 mol) of bis-trimethylsilylacrylamide and 2 g (0.0067 mol) of N,N'-bis-trimethylsilyl-N,N'-methylene-bis-acrylamide (corresponding to 14.5 mole% of crosslinking agent) are heated without solvent and without radical initiator but with exclusion of moisture to 100° C. After 1 hour, an opaque, rubber-like elastic mass has formed which can be comminuted under nitrogen according to conventional methods to obtain particle sizes of, e.g., from about 0.5 to 1.0 mm. The obtained crosslinked silylated polyacrylamide is insoluble in the usual solvents such as benzene, pyridine, tetrahydrofurane, methylene chloride and N,N-dimethylacetamide.

(B) 2 g (0.0093 mol) of bis-trimethylsilylacrylamide and 6 g (0.020 mol) of N,N'-bis-trimethylsilyl-N,N'-methylene-bis-acrylamide (corresponding to 215 mole% of crosslinking agent) are heated to 100° C as described above under (A). After 1 hour's reaction time, a clear insoluble silylated polyacrylamide is obtained.

(C) 10 g (0.0465 mol) of bis-trimethylsilylacrylamide and 10 g (0.050 mol) of ethylene glycol-dimethacrylate (corresponding to 107.5 mole% of crosslinking agent) are heated to 100° C without solvent as described above under (A). After 45 minutes' reaction time, a solid, hard mass is obtained which is insoluble in the customary solvents and which does not swell.

The N,N'-bis-trimethylsilyl-N,N'-methylene-bis-acrylamide used as crosslinking agent in the above examples is manufactured as follows:

850 ml of anhydrous triethylamine and 92.5 g (0.6 mol) of N,N'-methylene-bis-acrylamide are initially introduced into a 2.5 liter sulphonation flask equipped with a stirrer, a thermometer, a reflux condenser and a dropping funnel. 220 g (approximately 2 mols) of trimethylchlorosilane are then added dropwise, whilst cooling occasionally with an ice bath, in such a way that the temperature of the reaction mixture does not exceed 15°–25° C. A little sulphur is then added, as a polymerisation inhibitor, to the reaction mixture, which is stirred overnight at 60° C. The following day, the triethylamine hydrochloride which has precipitated is filtered off, the filter cake is washed with approximately 300 ml of triethylamine, and the filtrates are finally combined and distilled in vacuo. 108 g of N,N'-bis-trimethylsilyl-N,N'-methylene-bis-acrylamide are obtained as a fraction distilling at 120° C/0.8 mm Hg.

Analysis: calculated C:52.3%; H:8.8%; N:9.4%; Si:18.8%; found C:51.9%; H:8.8%; N:9.4%; Si:19.0%.

EXAMPLE 5

10 g (0.0465 mol) of bis-trimethylsilylacrylamide and 10 g (0.050 mol) of ethylene glycol-dimethacrylate are heated without solvent but in the presence of 0.2 g of α,α'-azo-isobutyronitrile and with the exclusion of moisture to 60° C. After 20 minutes a hard mass has formed which is insoluble in the customary solvents and which does not swell.

EXAMPLE 6

10 g of a pulverulent urea-formaldehyde resin of specific surface area 65 m$^2$/g are impregnated with a solution of 9 g (0.04 mol) of bis-trimethylsilylacrylic acid amide, 3 g (0.015 mol) of 1,4-butanediol-diacrylate and 300 ml of α,α'-azo-isobutyronitrile in 30 ml of anhydrous benzene in a 100 ml flask, with exclusion of moisture. The excess solution is then filtered off and the resin, which is still moist, is heated for 4 hours to 80° C under nitrogen. Thereafter, the benzene is removed in vacuo at 100° C. 15 g of resin are obtained, that is to say the carrier is coated with approximately 5 g of poly-bis-trimethylsilylacrylamide crosslinked with 1,4-butanediol-diacrylate. Si content: calculated 6.5%, found 5.7%.

EXAMPLE 7

90 g of pulverulent melamine-formaldehyde resin (specific surface area 192 m$^2$/g) are impregnated with a solution of 54 g (0.25 mol) of bis-trimethylsilylacrylic acid amide, 18 g (0.06 mol) of N,N'-bis-trimethylsilyl-N,N-'-methylene-bis-acrylamide and 900 mg of α,α'-azo-isobutyronitrile in 180 ml of anhydrous benzene. The excess solution is then filtered off and the resin, whilst still moist, is heated to 80° C under nitrogen. The resulting carrier material, which is coated with crosslinked poly-bis-trimethylsilylacrylamide, is dried in vacuo at 100° C. 122 g of dry resin are obtained, that is to say the melamine-formaldehyde carrier has taken up 32 g of the poly-bis-trimethylsilylacrylamide crosslinked with N,N'-bis-trimethylsilyl-N,N'-methylene-bis-acrylamide. Si content: calculated 6.3%, found 5.7%.

EXAMPLE 8

17.5 g of dry diatomaceous earth (80–100 mesh) are impregnated with a solution of 12 g (0.056 mol) of bis-trimethylsilylacrylamide and 3 g (0.01 mol) of N,N'-bis-trimethylsilyl-N,N'-methylene-bis-acrylamide and 0.3 g (= 0.2% by weight) of α,α'-azo-isobutyronitrile in 50 ml of anhydrous benzene. The excess solution is then filtered off and the impregnated material, which is still moist, is heated to 70° C overnight. Thereafter the granular material is washed with benzene in order to remove residual monomer which has not polymerised. (Crosslinking agent about 18 mole%).

EXAMPLE 9

30 g of neutral granular aluminium oxide are impregnated with a solution of 27 g (0.125 mol) of bis-trimethylsilylacrylamide and 9 g (0.045 mol) of 1,4-butanediol-diacrylate (corresponding to about 36 mole% of crosslinking agent, based on the silylated acrylamide) and 0.9 g of α,α'-azo-isobutyronitrile in 90 ml of toluene. The excess solution is filtered off, and polymerisation is carried out for 2 hours at 90°–100° C. Residual solvent is filtered off under nitrogen, 100 ml of toluene are added, the whole is shaken for 30 minutes and then filtered to dryness under nitrogen. Finally, the coated aluminium oxide is dried under high vacuum at about 25° C. 33.68 g of coated aluminium oxide are obtained, that is to say the aluminium oxide has taken up 11% by weight of crosslinked poly-bis-trimethylsilylacrylamide.

EXAMPLE 10

151,5 g of a macroporous polystyrene gel is soaked with a solution of 180 g of bis-trimethylsilylacrylamide (0.84 mol) and 40 g (0.2 mol) of ethylene glycol-dimethacrylate (corresponding to 24 mole% of crosslinking agent) and 5 g of α,α'-azo-isobutyronitrile in 160 ml of dry benzene. The excess solution is then filtered off and the resin, which is still moist, is heated for 16 hours to 70° C under nitrogen in a round-bottomed flask equipped with a reflux condenser. The resultant resin-coated polystyrene gel is then washed twice with benzene and then dried at 20°–25° C in high vacuum. Yield 240.35 g, which means that the carrier material is coated with 88.85 g of crosslinked bis-trimethylsilyl-acrylamide resin. The elemental analysis showed a silicon content of 8.4%.

EXAMPLE 11

30 mg (0.125 mmol) of 5-amino-2-(2'-hydroxy-5'-methylphenyl)-benzotriazole are dissolved in 5 ml of tetrahydrofurane and 0.2 g of the poly-bis-trimethyl-silylacrylamide obtained according to Example 4(A) is added and filtered off again after a few minutes. To verify silylation of 2'-hydroxy group of the 5-amino-2-(2'-hydroxy-5'-methylphenyl)-benzotriazole, the reaction solution is irradiated with UV light. An intense fluorescence, caused by the silylation of said 2'-hydroxy group manifests itself immediately.

EXAMPLE 12

14 g of the swollen poly-bis-trimethylsilylacrylamide gel obtained according to Example 1 are comminuted, introduced into a 50 ml flask and covered with 30 ml of anhydrous benzene. 400 mg (4.25 mmols) of phenol are added to the suspension obtained, after which the reaction mixture is shaken for approximately 2 hours at about 20° C. The gel is then filtered off. Examination of the filtrate by gas chromatography shows that 90 mole% of phenol have been silylated. If the reaction mixture is warmed for a further 30 minutes in a water-bath at 60° C and is subsequently again examined by gas chromatography, exclusively 96 mole% of trimethylsilylphenol, and no further phenol, are found.

EXAMPLE 13

14 g of the poly-bis-trimethylsilylacrylamide resin manufactured according to Example 6 are flushed with anhydrous benzene into a 2 cm diameter chromatography column and washed with approximately 100 ml of anhydrous benzene. 1 g (0.0106 mol) of phenol, dissolved in a little benzene, is subsequently introduced into the column and elution is slowly carried out with benzene. Analysis, by gas chromatography, of 11 fractions each of 5 ml shows that they only contain silylated phenol (yield 75 mole%).

EXAMPLE 14

83 g of the poly-bis-trimethylsilylacrylamide resin manufactured according to Example 7 and 9.2 g (0.025 mol) of p-nitro-2,3,6-triphenylphenol are shaken for 5 hours in 300 ml of anhydrous benzene in a 500 ml flask. The excess silylating agent (poly-bis-trimethylsilylacrylamide resin) is then filtered off and the filtrate is evaporated to dryness in a rotary evaporator. The yield of crude O-trimethylsilyl-p-nitro-2,3,6-triphenylbenzol is practically 100% of theory.

Analysis: calculated C:73.77%; H:5.73%; N:3.19%; Si:6.39%; found C:73.95%; H:5.88%; N:3.26%; Si:6.14%.

Silylation of a porous polyacrylamide gel

For comparison purposes, 20 g of a commercially available macro-porous polyacrylamide gel ("Biogel P 300", manufactured and sold by Bio Rad Laboratories, Richmond, Calif., USA) were first dehydrated with toluene in a Soxleth extraction apparatus and then treated for 5 hours at 100° C with anhydrous N,N-dimethylacetamide. The gel was then introduced into a round flask, 40 ml of fresh N,N-dimethylacetamide and 40 ml of bis-trimethylsilylacetamide were added and the reaction mixture was stirred for 5 hours under nitrogen at 80° C. The reaction mixture was then filtered under nitrogen, first washed with fresh anhydrous N,N-dimethylacetamide and then twice with cyclohexane. Elemental analysis of the dried sample did not show any silicon.

The gel, which had been treated as above, and cyclohexane were then introduced into a chromatography column. 0.5 ml of a 1-molar solution of isopropanol in cyclohexane were added, and elution was effected with cyclohexane. No trimethylsilylpropanol could be detected in the resultant 10 fractions, either by infra-red spectrum or by gas chromatography.

In the same manner, 20 g of freshly prepared, non-crosslinked polyacrylamide were treated at 80° C in N,N-dimethylacetamide with bis-trimethylsilylacetamide. Here again, elemental analysis of the dried sample did not show any silicon. This test was repeated at 130° C, and the resultant polyacrylamide was introduced into a round flask together with tetrahydrofurane and 0.5 ml of a 1-molar isopropanol solution in tetrahydrofurane, and the whole was shaken for 5 hours at 50° C. No silylated isopropanol could be detected in the reaction solution after this time.

Hence, silylation of the polyacrylamide substrates was not successful.

What we claim is:

1. A crosslinked polyacrylamide containing silyl groups which is prepared by polymerising a silylated acrylic acid amide, of formula Ia or Ib

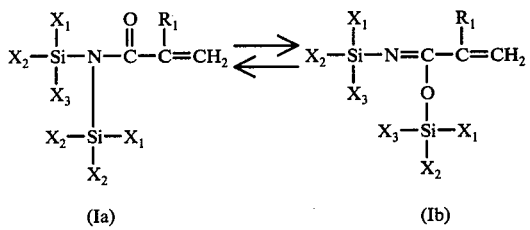

wherein
$X_1$, $X_2$ and $X_3$ independently of one another represent hydrogen, alkyl having 1 or 2 carbon atoms, alkoxy having 1 to 4 carbon atoms, cyclohexyl, phenyl, phenoxy or benzyl, and
$R_1$ is hydrogen or alkyl having 1 to 4 carbon atoms, in the presence of from about 5 to 250 mole%, based on the silylated acrylic acid amide, of a crosslinking agent of formula II

wherein
p represents the number 2 or 3,
$Q_1$ represents hydrogen or methyl,
Q, when $p = 2$, represents —$SO_2$—, phenylene,

with 2 to 4 carbon atoms in the alkylene moiety,

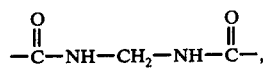

or, when $X_1$, $X_2$ and $X_3$ are each methyl, also represents

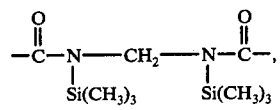

or, when $p = 3$, Q represents the group of the formula

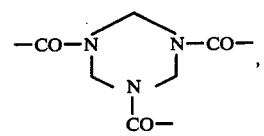

the polymerisation being carried out at a temperature between about 20° and 120° C.

2. A crosslinked polyacrylamide containing silyl groups as claimed in claim 1, wherein $X_1$, $X_2$ and $X_3$ independently of one another are methyl, ethyl or phenyl and $R_1$ is hydrogen, methyl or ethyl.

3. A crosslinked polyacrylamide containing silyl groups as claimed in claim 1, wherein $X_1$, $X_2$ and $X_3$ each represent methyl and $R_1$ represents hydrogen or methyl.

4. A crosslinked polyacrylamide containing silyl groups as claimed in claim 1, wherein the crosslinking agent of formula II is selected from the group consisting of ethylene glycol-dimethacrylate, 1,4-butanediol-diacrylate, 1,4-butanediol-dimethacrylate, N,N'-methylene-bis-acrylamide, and, if $X_1$, $X_2$ and $X_3$ are each methyl, N,N'-bis-trimethylsilyl-N,N'-methylene-bis-acrylamide.

5. A crosslinked polyacrylamide containing silyl groups as claimed in claim 1, which is prepared by polymerising bis-trimethylsilyl-acrylic acid amide in the presence of ethylene glycol-dimethacrylate, 1,4-butanediol-diacrylate or N,N'-bis-trimethylsilyl-N,N'-methylene-bis-acrylamide.

6. A crosslinked polyacrylamide containing silyl groups as claimed in claim 1, wherein the polymerisation is carried out in the presence of an inert carrier material.

7. A crosslinked polyacrylamide containing silyl groups as claimed in claim 1, wherein the polymerisation is carried out in the presence of a radical initiator.

8. A crosslinked polyacrylamide containing silyl groups as claimed in claim 1, wherein the polymerisation is carried out in an inert aprotic organic solvent.

9. A crosslinked polyacrylamide containing silyl groups as claimed in claim 1, wherein the polymerisation is carried out in anhydrous benzene, toluene, cyclohexane or dioxane.

* * * * *